April 22, 1952 J. O. YEIDA 2,593,644
STOKER CONTROL
Filed Sept. 1, 1945
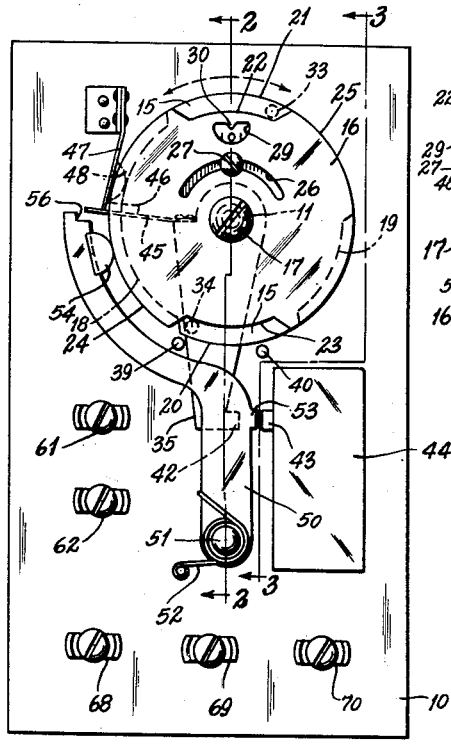
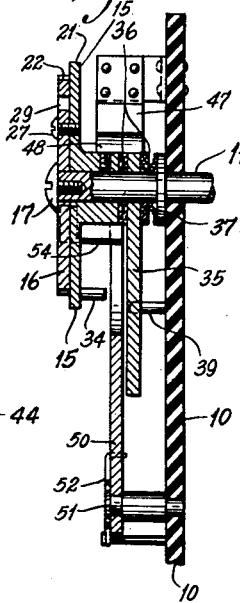
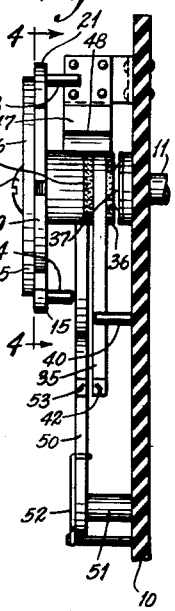
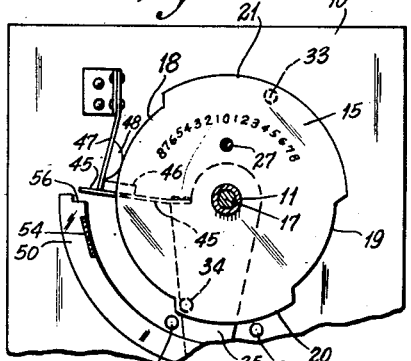
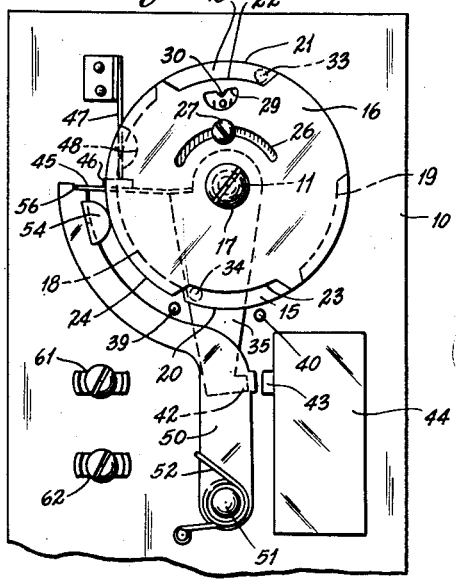
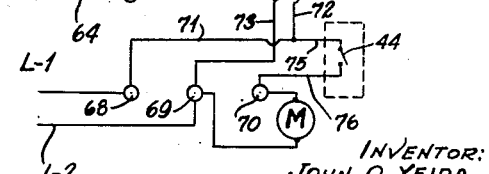
INVENTOR:
JOHN O. YEIDA,
BY Kingsland, Rogers & Ezell
ATTORNEYS.

Patented Apr. 22, 1952

2,593,644

UNITED STATES PATENT OFFICE 2,593,644

STOKER CONTROL

John O. Yeida, Herculaneum, Mo., assignor, by mesne assignments, to Missouri Automatic Control Corporation, a corporation of Missouri Application September 1, 1945, Serial No. 614,040

15 Claims. (Cl. 236—46)

The present invention relates to a stoker control.

It is an object of the invention to provide a stoker control having a hold-fire operating means and a room thermostat operating means, both interconnected with a single electric motor to produce their respective results by reverse operations of this motor.

A further object is to provide, in a control of the foregoing kind, means to prevent the hold-fire operation from occurring during the period of operation by the thermostat.

In the drawings:

Fig. 1 is a front elevation of a control in accordance with this invention;

Fig. 2 is a vertical section on the line 2—2 of Fig. 1;

Fig. 3 is a vertical section on the line 3—3 of Fig. 1;

Fig. 4 is a vertical section on the line 4—4 of Fig. 3;

Fig. 5 is a view similar to Fig. 1, but with the control in another position; and Fig. 6 is wiring diagram for the control.

The control has a supporting plate 10, preferably of insulating material. On this control plate 10 is mounted a shaft 11, which projects through the plate 10. On the right hand side of the plate, in Figs. 2 and 3, this shaft is adapted to be connected with a timing motor designated in Fig. 6 at 12. The timing motor is an electric motor of known type, which normally runs at constant speed in one direction, but which may be reversed when a reversing circuit is energized.

The shaft 11 receives a fixed cam disc 15 having a hub surrounding and secured to the shaft, somewhat inwardly from the end thereof. The shaft also receives a second cam disc 16 that is adapted for rotary adjustment on the shaft. A screw 17 threaded into the end of the shaft 11 prevents the removal of the second cam disc 16.

The cam disc 15 is provided with a plurality of notches 18 and 19 between which are cam rises 20 and 21. The cam disc 16 has a plurality of cam notches 22 and 23 separated by rises 24 and 25. The cam disc 16 has an arcuate slot 26 to receive a screw 27 threaded into the cam disc 15.

The slot 26 is of sufficient size to permit the relative adjustment of the two cam discs. In Fig. 1, there is shown an opening 29 in the outer disc 16, this opening having an index 30 which registers with graduations on the inner disc 15 that are visible through the opening 29.

It will be seen, by reference to Fig. 1, that the index 30 is set at the zero graduation, and it will also be seen that there is no cam notch formed by the setting of the two cam discs in Fig. 1. If the outer cam disc 16 be moved clockwise while the inner cam disc 15 is held stationary, the notch 22 of the outer cam disc 16 will remain in registry with the rise 21 of the disc 15, and no drop will be provided thereat for the aggregate cam structure. However, the notch 23 will move into registry with the notch 18 on the lower cam disc to provide a cam drop, the arcuate length of which varies with the clockwise adjustment of the outer disc. If the front cam disc 16 is rotated counterclockwise relative to the inner cam disc 15, the notch 22 on the outer cam disc will move into registration with the notch 18 on the inner cam disc. Also, the notch 23 on the outer cam disc will move into registry with the notch 19 on the inner cam disc and there will be provided two effective notches spaced approximately 180° apart, the lengths of each of the notches being determined by the degree of relative adjustment of the two cam discs. The graduations are preferably in minutes.

The clock motor shaft 11 will be designed to rotate a certain number of revolutions per hour. Assuming that the rotation is one per hour, the adjustment of the outer cam disc clockwise relative to the inner cam disc will provide one cam drop per hour of a length (in minutes) determined by the particular graduation on the inner cam disc that registers with the index 30. Should the outer cam disc be rotated counterclockwise, then two cam notches per hour will be provided, each having a time interval equal to that designated on the graduations.

The inner cam disc 15 has two pins 33 and 34 that extend backwardly from its inner surface toward the mounting plate 10, for a purpose to be described.

Back of the hub of the inner cam disc 15 on the shaft 11 is an arm 35 that is rotatably mounted on the shaft 11. This arm is frictionally engaged through friction discs 36 between the fixed hub of the cam 15 and a spring washer member 37. As a result, this arm is urged to rotate with the shaft 11, but the shaft may slip relative to the arm. The actual amount of movement of the arm 35 is very limited, being restricted by two pins 39 and 40 that project forwardly from the mounting plate 10 to the opposite sides of the arm 35.

The arm has a button 42 on it that is adapted to engage with a switch button 43 of a switch member generally indicated at 44. This switch may be of a known type such as a micro-switch.

Near its upper end, the arm 35 has mounted thereon a spring blade 45. This spring blade has a ledge 46 adapted to engage with the end of a second depending spring blade 47 mounted on the face of the plate 10. The blade 47 has a projection 48 thereon extending outwardly from the plate 10, that is in a position to be engaged by the two pins 33 and 34 on the cam disc 15. However, these two pins do not project toward the plate far enough to engage the spring arm 45.

The plate 10 also supports a cam control arm 50 pivotally mounted at 51 on the plate. A torsion spring 52 provides a continuous force on the arm 50 urging it clockwise in Fig. 1. This arm has a shape substantially as shown in Fig. 1. It extends outwardly to lie along the depending end of the other arm 35 and it has a switch actuating button 53 that is also adapted to actuate the switch button 43.

Adjacent its upper end, the arm 50 has a cam engaging projection 54 that is adapted to ride on the edges of the two cam discs 15 and 16 and to ride into such notch spaces as are provided by the relative adjustments of these two cam discs. It will be understood that the projection 54 on the arm extends laterally outwardly away from the plate 10, so as to come against the edges of the cam.

At its extreme outer end, the arm 50 has a notch 56 that is disposed in a position to engage the outer end of the spring 45 on the other arm 35, in one position of that spring.

The connections are shown in Fig. 6. A room thermostat 60 is adapted to be connected to two terminals 61 and 62 by wires 63 and 64. These two terminals appear on the plate 10 in Fig. 1. Within the mechanism itself, the two terminals 61 and 62 are connected by wires 65 and 66 with the motor 12.

The control has three other terminals 68, 69 and 70. The two terminals 68 and 69 are adapted to be connected to the power line leads L–1 and L–2. Within the control, the terminal 68 is connected by a line 71 with a line 72 that runs into the main windings of the motor 12 from which another lead 73 is connected with the other terminal 69. The line 71 is also connected by a line 75 with the switch 44. Another line 76, from the switch, leads to the terminal 70. The stoker motor, or corresponding device, is adapted to be connected between the two terminals 69 and 70.

Operation

The timing motor 12, as already noted, is one that normally rotates continuously at constant speed in one direction; that is to say, when the lines 71, 72, and 73 are connected with the terminals 68 and 69 and with the two power lines L–1 and L–2, the motor 12 will rotate so that the shaft 11 turns clockwise in Fig. 1. However, when the room thermostat 60 closes, additional windings in the motor will reverse its direction so that it causes the shaft 11 to rotate in a counterclockwise direction in Fig. 1.

The switch 44 is closed when its button 43 is depressed by either of the two levers 35 or 50. When it is closed, it will be seen that a circuit through L–1, terminal 68, line 71, line 75, switch 44, line 76, terminal 70, stoker motor M and terminal 69 to line L–2 is established, and the stoker motor will operate.

Thus, normally, when the room thermostat is satisfied the cams will be set to provide one or two notches per hour or other chosen interval. Whenever a cam notch is presented to the projection 54 on the lever 50, this projection will move toward the shaft 11, because of the force of the torsion spring 52 on the lever 50. It will move sufficiently far to cause the button 53 on the lever to depress the switch button 43 and close the switch 44. This will start the stoker motor, as already indicated. The stoker motor will run for a period of time determined by the setting of the cams. This period must be sufficient to supply coal to keep the fire in minimum operation until the next hold-fire period is provided by the clock motor cams.

If, at any time, the room thermostat closes, it will reverse the direction of rotation of the timing motor 12. As soon as this reverse rotation commences, the arm 35 will be moved counterclockwise, in Fig. 1, under the influence of its frictional engagement with the shaft 11. It will, after a very short amount of rotation, cause the button 42 to depress the button 43 of the switch 44 and start the stoker motor.

But this counterclockwise movement of the arm 35 will bring the spring lever 45 down so that its outer end engages within the notch 56 of the other arm 50. In this operation, the spring arm 47 will move inwardly over the button 46 on the arm 45, preventing upward release movement of that arm. The arm 45 will, in this position, prevent the arm 50 from moving inwardly to provide one of its hold-fire actuations of the switch 44, whatever be the position of the cams 15 and 16. However, if, at the time the room thermostat reverses the motor, the projection 54 is in a cam depression, the arm 45 obviously will not be permitted to fall into the notch 56. The arm 45, being a spring, will nevertheless permit the arm 35 to move into position to actuate the switch. The cam will continue to rotate until the projection 54 is moved out of the notch; whereupon, the arm 45 will drop into the notch 56, and latch the arm 50 against clockwise movement.

The arm 35 will hold the switch 44 closed as long as the shaft 11 is rotating counterclockwise in Fig. 1, although the arm 35 will have a degree of movement limited to that permitted by the pin 40 or the switch 44. As soon as the room thermostat opens, the motor 12 will immediately reverse. The arm 35 will then move back, flexing the spring arm 45, which is latched by the other arm 47 over the button 46. The pins 33 and 34, are adapted to engage the projection 48 on the arm 47; hence, as soon as the clockwise rotation of the shaft 11 in Fig. 1 has proceeded far enough to cause one of the two pins 33 and 34 to displace the arm 46 outwardly, the spring arm 45 can move upwardly to return to the position of Fig. 4.

The pins 33 and 34 are so located on the cam disc 15 that a period of operation of at least several minutes is assured before another hold-fire operation can take place, the elements 48 and 54 are made larger than actual size, and are somewhat spaced apart angularly, for clarity of illustration. Obviously these parts may be made close together to increase the gaps between furnace operations regardless of the adjustment of the cams and regardless of the position occupied by the cams when the thermostat opens. The maximum period of this delay will be one-half hour (or one-half a revolution). This prevents an overload of the furnace by addition of hold-fire fuel immediately after a thermostatic cycle.

In some controls, the latching means 45—48 and 56 may be omitted. This eliminates the feature of preventing the overload referred to.

What is claimed is:

1. In a control for operating switch means, a reversible shaft, a first switch actuating arm, means on the shaft to operate the first arm to switch operating position at intervals during the rotation of the shaft in one direction, a second switch actuating arm, means on the shaft for operating the second arm to switch actuating position when the shaft is rotated in the opposite direction, and means to prevent operation of the first arm for a period after actuation of the second arm.

2. In a control for operating a member displaceable from first to second position, a reversible shaft, first means on the shaft for displacing the displaceable member from first to second position at regular intervals in the rotation of the shaft in one direction, second means normally in position to permit the displaceable member to occupy first position, but movable to actuate the member to second position, and means to cause the second means to move to so actuate the member upon reverse movement of the shaft, said last named means comprising a slip connection between the shaft and the second means, and means to limit movement of the second means by the slip connection, when the shaft moves in its normal direction.

3. In a control for operating a member displaceable from first to second position, a reversible shaft, first means on the shaft for displacing the displaceable member from first to second position at regular intervals in the rotation of the shaft in one direction, said first means comprising cam mechanism driven by the shaft, and a cam follower movable thereby, to actuate the displaceable member, second means normally in position to permit the displaceable member to occupy the first position, but movable to actuate the member to second position, means to cause the second means to move to so actuate the member upon reverse movement of the shaft, and latch means to prevent the cam follower from moving into position to actuate the member, when the shaft is moving in a reverse direction.

4. In a control for operating a member displaceable from first to second position, a reversible shaft, first means on the shaft for displacing the displaceable member from first to second position at regular intervals in the rotation of the shaft in one direction, said first means comprising cam mechanism driven by the shaft, and a cam follower movable thereby, to actuate the displaceable member, second means normally in position to permit the displaceable member to occupy first position, but movable to actuate the member to second position, means to cause the second means to move to so actuate the member upon reverse movement of the shaft, and latch means to prevent the cam follower from moving into position to actuate the member, when the shaft is moving in a reverse direction, said latch means including an engaging member movable by the second means to engage the cam follower to prevent its movement to second position, a latch member shiftable over the engaging member to prevent its disengagement, said latch member being automatically shiftable when the engaging member moves to engaging position, and means to release the latch comprising an element on the cam.

5. In a control for operating a member displaceable from a first to a second position, a base, a reversible shaft, cam means on the shaft, a first arm pivoted on the base and engageable with the cam means to move therewith, and engageable with the displaceable member, a second arm rotatably mounted on the shaft and engageable with the displaceable member, slip power transmission connecting means between the shaft and the second arm to urge the second arm to move with the shaft, said shaft moving the cams to operate the first arm when rotated in one direction, means to prevent the second arm from following the first in said one direction, and the shaft moving the second arm to operate the displaceable member when the shaft rotates in a reverse direction.

6. In a control for stokers having electric motor means, a reversible shaft, a reversible motor for operating the shaft, said motor normally operating in one direction, hold-fire means operated by rotation of the shaft in said one direction to operate the electric motor means at intervals, a space thermostat, connections to reverse the reversible motor when the space thermostat demands heat, and means operated when the motor reverses to hold the electric motor means in operation.

7. In a control for operating a means for controlling mechanism to produce changes in physical conditions, a shaft, a reversible motor for operating the shaft, means operable in response to changes in physical conditions movable into one position in response to predetermined physical conditions to cause the motor to operate the shaft in a forward direction, and movable into another position in response to other physical conditions to cause the motor to operate the shaft in a reverse direction, control means to regulate operation of the mechanism, means operated by forward rotation of the shaft to operate the control means intermittently at regular intervals, and means operated by reverse rotation of the shaft to operate the control means continuously for the duration of such reverse rotation.

8. In a control mechanism for operating a switch means, a shaft, a reversible motor for operating the shaft, means movable in response to changes in physical conditions to which it is subjected, said means being movable into one position to cause the motor to operate the shaft in a forward direction, and movable into another position to cause the motor to operate the shaft in a reverse direction, switch means for regulating a device to change the aforesaid physical conditions, means operated by forward rotation of the shaft to operate the switch means intermittently at regular intervals, means operated by reverse rotation of the shaft to operate the switch means continuously for the duration of such reverse rotation, and means in the control mechanism for adjusting the duration of said regular intervals per revolution of the shaft.

9. In a control mechanism for operating a switch means, a shaft, a reversible motor for operating the shaft, means movable in response to changes in physical conditions to which it is subjected, said means being movable into one position to cause the motor to operate the shaft in a forward direction, and movable into another position to cause the motor to operate the shaft in a reverse direction, switch means for regulating a device to change the aforesaid physical conditions, means operated by forward rotation of the shaft to operate the switch means intermittently at regular intervals, means operated by reverse rotation of the shaft to operate the switch means continuously for the duration of such reverse rotation, and means in the control mechanism for adjusting the frequency of said regular intervals per revolution of the shaft.

10. In a control for operating a switch means for regulating means to produce changes in physical conditions, a shaft, a reversible motor for operating the shaft, means movable into one position to cause the motor to operate the shaft in a forward direction, and movable into another position to cause the motor to operate the shaft in a reverse direction, switch means, means operated by forward rotation of the shaft to operate the switch means intermittently at regular intervals, and means operated by reverse rotation of the shaft to operate the switch means continuously for the duration of such reverse rotation, the means movable to cause the motor to operate forward or in reverse comprising an automatic switch device operable in response to changes in physical conditions.

11. In a control for operating a switch means, a shaft, a reversible motor for operating the shaft, means movable into one position to cause the motor to operate the shaft in a forward direction, and movable into another position to cause the motor to operate the shaft in a reverse direction, switch means, means operated by forward rotation of the shaft to operate the switch means intermittently at regular intervals, and means operated by reverse rotation of the shaft to operate the switch means continuously for the duration of such reverse rotation, the means movable to cause the motor to operate forward or in reverse comprising an automatic switch device operable in response to changes in physical conditions, and means operated by the operation of the switch means that alters the physical conditions that affect the automatic switch.

12. In a control for operating a switch means, a shaft, a reversible motor for operating the shaft, means movable into one position to cause the motor to operate the shaft in a forward direction, and movable into another position to cause the motor to operate the shaft in a reverse direction, switch means, means operated by forward rotation of the shaft to operate the switch means intermittently at regular intervals, and means operated by reverse rotation of the shaft to operate the switch means continuously for the duration of such reverse rotation, the means movable to cause the motor to operate forward or in reverse comprising a thermostatic switch device, and mechanism operated by the operation of the switch means that influences the thermostatic switch.

13. In a control for operating a switch means, a shaft, a reversible motor for operating the shaft, means movable into one position to cause the motor to operate the shaft in a forward direction, and movable into another position to cause the motor to operate the shaft in a reverse direction, switch means, means operated by forward rotation of the shaft to operate the switch means intermittently at regular intervals, and means operated by reverse rotation of the shaft to operate the switch means continuously for the duration of such reverse rotation, the means movable to cause the motor to operate forward or in reverse comprising a thermostatic switch device, and a heating means energized by operation of the switch means, the heating means being energized at regular intervals when the thermostat is satisfied, and being operated continuously when the thermostat demands heat.

14. In a control for operating a first member displaceable from first to second position, a reversible rotary shaft, first means operated by rotation of the rotary shaft in one direction for displacing the displaceable member from first to second position at regular intervals in the rotation of the shaft, second means having an element connected with the shaft to be rocked thereby, the said element being rocked into position by forward rotation of the shaft to enable the displaceable member to occupy first position, and connecting means between the shaft and the said element to rock the element upon reverse rotation of the shaft to move the displaceable member to its second position.

15. The combination of claim 14 in which the first means comprises a cam mechanism driven by the shaft and a cam follower movable thereby to actuate the displaceable member.

JOHN O. YEIDA.

REFERENCES CITED

The following references are of record in the file of this patent:

UNITED STATES PATENTS

| Number | Name | Date |
|---|---|---|
| 1,273,378 | Kennington | July 23, 1918 |
| 1,457,462 | Riker | June 5, 1923 |
| 2,288,300 | Ray | June 30, 1942 |
| 2,344,183 | Teeple | Mar. 14, 1944 |
| 2,359,596 | Walsh | Oct. 3, 1944 |
| 2,364,184 | Baak | Dec. 5, 1944 |